Dec. 10, 1968   MITSURU KODAMA   3,414,930
WIPER BLADE CONSTRUCTION
Filed March 3, 1967   2 Sheets-Sheet 1
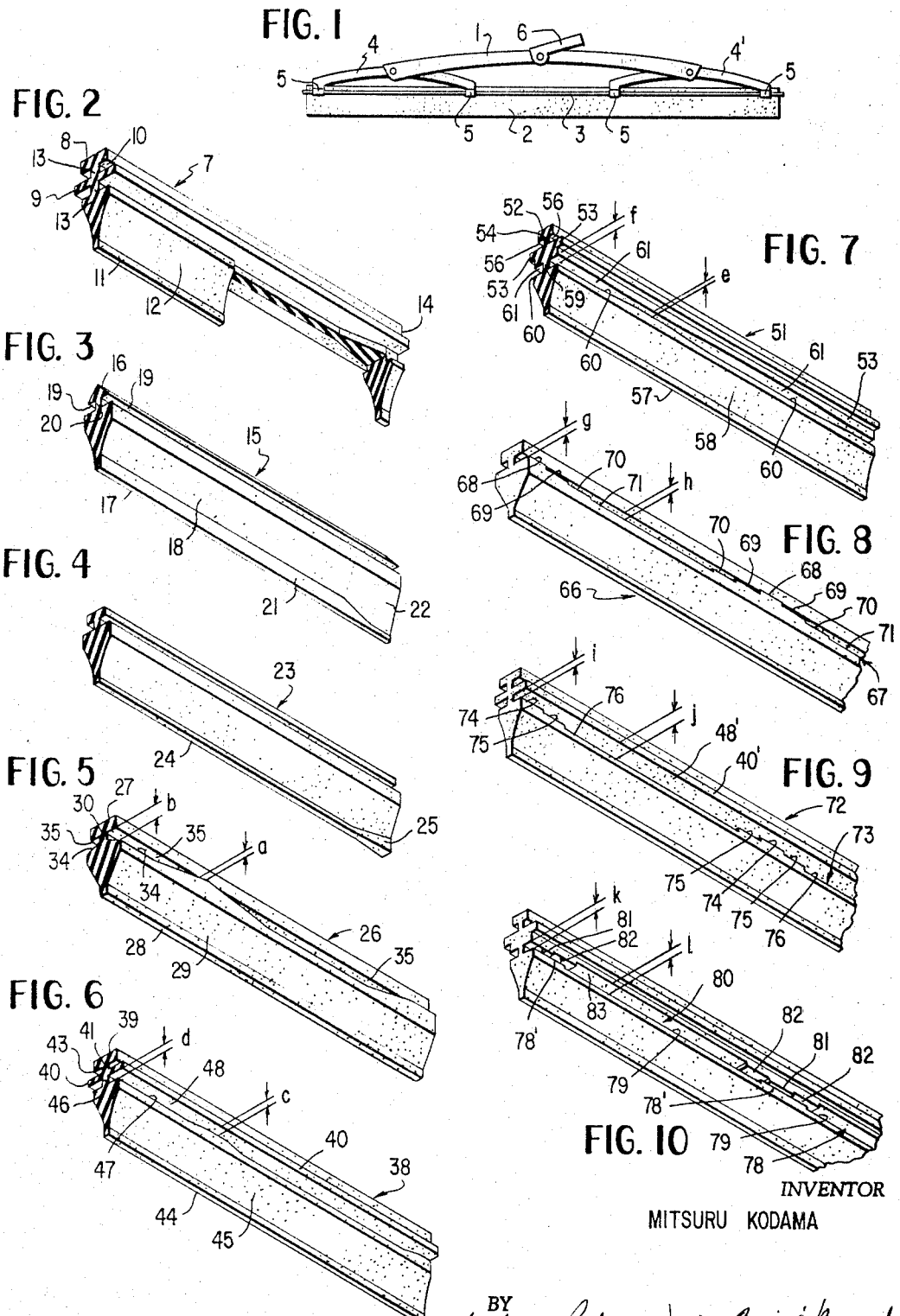
INVENTOR
MITSURU KODAMA
ATTORNEYS Dec. 10, 1968 MITSURU KODAMA 3,414,930
WIPER BLADE CONSTRUCTION Filed March 3, 1967 2 Sheets-Sheet 2

INVENTOR
MITSURU KODAMA

BY
ATTORNEYS.

United States Patent Office 3,414,930
Patented Dec. 10, 1968

3,414,930
WIPER BLADE CONSTRUCTION
Mitsuru Kodama, Tokyo, Japan, assignor to Ichikawa Seisakusho Co., Ltd., Tokyo, Japan
Filed Mar. 3, 1967, Ser. No. 620,426
Claims priority, application Japan, Mar. 3, 1966, 41/13,042
6 Claims. (Cl. 15—250.36)

ABSTRACT OF THE DISCLOSURE

A wiper blade having elongated grooves therein for securing the blade to a windshield wiping apparatus. The width of the elongated grooves varies inversely with the load applied to the blade along the length thereof.

Background of the invention

The wiper blades for wiping window glass such as the windshield of an automobile are generally made of flexible material such as rubber or the like. The wiping motion should be made while maintaining a predetermined angle between the blade and the glass which is being wiped. Therefore, it is desirable for every portion of the blade along the length thereof to contact the glass with the same angle.

Most prior art supporting structures for wiper blades are constructed as shown in FIGURE 1 wherein the central portions of the secondary load distributing members 4, 4', which engage the blade supporting resilient strips 3 at spaced locations, are pivotally connected at opposite ends of the primary load distributing member 1. The member 1 is pivotally connected to connecting member 6 which, in turn, is connected to an arm driven by a suitable driving means. When the load is distributed by an arrangement such as described above with reference to FIGURE 1, a larger load is applied at the points of connection between the secondary load distributing members 4, 4' and the resilient strips 3. Such an unequal load distribution causes a variation in the angle between the glass and blade 2 along the length thereof. As a result, water drops often remain on the glass to impair the vision of the driver.

Summary of the invention

A wiper blade construction comprising an upper supporting portion and a lower trigonal shaped wiping portion, groove means disposed in opposite sides of said upper supporting portion and extending along the length thereof, said groove means having upper and lower walls having variable spacing therebetween along the length of said wiper blade with the distance therebetween varying inversely with respect to the load applied to that portion of the wiper blade.

Other features of the invention will be pointed out in the following description and claims and illustrated in the accompanying drawings, which disclose by way of example, the principles of the invention in the best mode which has been contemplated of applying those principles.

In the drawings:

FIGURE 1 is a side view showing the usual supporting apparatus for a wiper blade;

FIGURES 2 through 4 are perspective views partially in section showing various forms of prior art wiper blades;

FIGURE 5 is a perspective view showing an embodiment of the present invention;

FIGURE 6 is a perspective view showing another embodiment of the present invention;

FIGURE 7 is a perspective view showing a further embodiment of the present invention;

FIGURE 8 is a perspective view of a modification of the embodiment shown in FIGURES 5 to 7;

FIGURE 9 is a perspective view showing still another modification;

FIGURE 10 is a perspective view showing a further modification;

Figure 17:
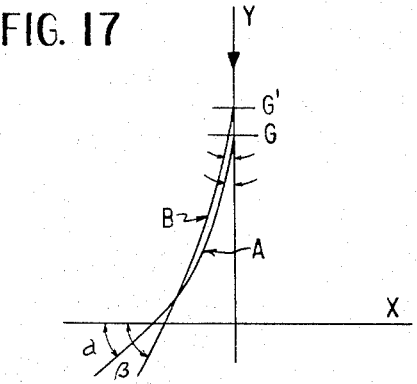
Figure 18:
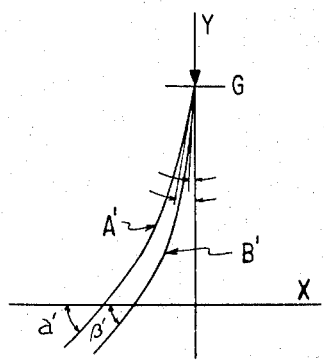

FIGURES 12 through 16, inclusive, are cross-sectional views of FIGURES 6 through 10, inclusive, respectively;

FIGURE 17 is a graphical illustration of the wiping angle for prior art blades; and FIGURE 18 is a graphical illustration of the wiping angle of the blade according to the present invention.

Turning now to the drawings in detail, FIGURE 1 shows a prior art supporting structure for wiper blades which uniformly distributes the load in the longitudinal direction of the wiper blade. The central portion of auxiliary bars 4, 4' are pivotally connected to the opposite ends of the primary load distributing bar 1 which, in turn, is pivoted as central portion to a connecting member 6. The connecting member 6 is connected at one end of an arm which is driven by any suitable driving apparatus. The opposite ends of the secondary load distributing members 4, 4' are provided with gripping members 5 which grip the opposite sides of resilient strips 3 which are positioned in longitudinally extending grooves in the side of the blade member 2. When the load is distributed by a structure as described above to the blade 2, a larger load is applied to the blade 2 at the locations where the connecting members 5 grip the resilient strips 3. Therefore, every portion of the blade 2 in the longitudinal direction cannot wipe the windshield glass with the same angle. As a result, water drops remain on the surface to be wiped thereby preventing clear visibility.

For the purpose of eliminating this kind of defect, prior art blades such as those shown in FIGURES 2 through 4, inclusive, have been used. The blade 7 shown in FIGURE 2 is comprised of a head 8, projections 9 and grooves 10 formed therebetween on opposite sides of the blade for receiving the resilient strips 3. The wiping portion of the blade 12 is provided with a wiping fringe 11 and a flexible connecting portion 13 which connects the wiping portion 12 with the projections 9. The connecting portion 13 is adapted to bend in order to reverse the angle of the wiping portion 12 with respect to the glass. The connecting portion 13 is enlarged adjacent the end 14 of the blade to compensate for the larger loads which are applied at this portion of the blade. The thickness of the connecting portion 13 may be varied depending upon the construction of the load distributing structure and the manner in which the blade is connected to the load distributing structure. Accordingly, by varying the thickness of the connection portion 13 the angle of the wiping blade with respect to the glass can be corrected to some extent.

The wiping angle between the blade 7 and the glass surface is shown in FIGURE 17. The angle $\alpha$ between modified fundamental line A of the blade where the load is small and window glass surface X is smaller than angle $\beta$ which is between modified fundamental line B of the blade in a portion having a larger load than the window glass surface X. In other words, greater rigidity is given to the portion of the blade where a larger load is imposed than the portion of the blade where a smaller load is imposed, so that the degree of bending in both portions is different (angle $\beta$ is greater than angle $\alpha$). Also, the contact load between wiping portion 11 of the blade and the window glass surface is different when the load is larger or smaller. In Figure 17, the load distributing part G of modified fundamental line A differs from the load distributing part G' of modified fundamental line B because the contact load between the wiping portion 11 of the blade and the window glass surface is assumed to be nearly constant. As seen from this phenomenon, if greater rigidity is given to a portion of the blade, then the contact load between the wiping portion 11 of the blade and the window glass surface differs in every location along the longitudinal direction of the blade when the load distributing parts G and G' are on the same plane. On the other hand, the angle between the wiping portion 11 of the blade and the window glass surface differs in every location when the load distributing parts G and G' are not on the same plane thereby rendering it difficult to obtain a good wiped surface.

In another part of our embodiment as shown in FIGURE 3, the blade 15 is formed with a pair of grooves 19 adapted to receive the resilient connecting strips between a head portion 16 and a wiping portion 18 provided with a wiping fringe or edge portion 17. The head portion 16 and the wiping portion 18 are connected by means of a flexible connecting neck portion 20 which flexes upon reversal of the wiping direction. The heavily loaded portions of the wiper blade adjacent the ends thereof are provided with a thick portion 22 which substantially eliminates the thin wiping fringe portion 17. In the lightly loaded portions of the wiper blade, the wiping fringe 17 has a greater width as indicated at 21.

The prior art blade that is shown in FIGURE 4 has nearly the same construction as the one shown in FIGURE 3 but in this case the wiping fringe 24 of the blade 23 is formed of a greater width at 25 to increase the rigidity of the wiping fringe. Therefore, prior art brushes have attempted to regulate the wiping angle by varying the rigidity of the heavily loaded portion and the lightly loaded portion of the wiper blade. However, it is difficult to eliminate the defects which have been described by merely increasing the thickness of the wiping blades at various portions thereof. The degree of elastic deformation of the blade depends nearly to the third power of the change of thickness of the blade. Therefore, a slight change of thickness would greatly increase the rigidity with the result that the desired effect could not be obtained.

The present invention eliminates the defects of the prior art constructions without changing the degree of elastic deformation by changing the thickness of the wiper blade.

Figure 11:
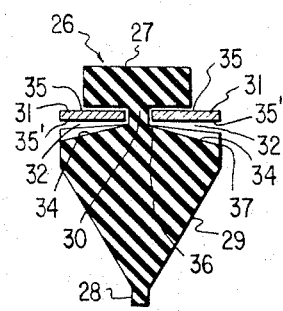
FIGURE 11 is a cross-sectional view of the embodiment shown in FIGURE 5.

The wiper blade 26 of the present invention as shown in FIGURES 5 or 11 is provided with a wiping portion 29 of a generally trigonal configuration, a wiping fringe 28 and a head 27 connected to the wiping portion 29 by means of a neck 30 which is adapted to bend upon reversal of the wiping motion. A pair of grooves 32 are formed on opposite sides of the blade and are adapted to receive the resilient strips 31 which connect the blade 26 to the driving mechanism and give the blade a predetermined rigidity. Each of the grooves 32 is provided with a flat upper surface extending the entire length of the wiper blade which is disposed perpendicular to the connecting portion 30. The lower surfac of each groove 32 is spaced from the upper surface of the groove by variable distance along the length of the groove. With respect to this embodiment and all the subsequent embodiments of the present invention, the upper surface of the groove will be referred to as the stop surface and the lower surface of the groove will be referred to as the regulating surface.

As the blade is oscillated back and forth to wipe a fan shaped area on the glass, the wiping portion 29 of the blade is always inclined in the direction of movement of the blade. The inclination of the blade must be changed each time the direction of movement of the wiping blade is reversed thehreby causing a bending of the wiping portion of the blade 29 about the flexible connecting portion 30.

The distance between the regulating surface 34 of the blade 26 and the stop surface 35 is narrowed (a) and the regulating surface 34 is parallel to the stop surface 35 at the heavily loaded portions of the blade. In the lightly loaded portions of the blade, the regulating surface 34 is inclined downwardly from the inner edge 36 of the regulating surface to the outer edge 37 and the distance between the outer edge of the stop surface 35 and the outer edge 37 of the regulating surface is wider (b). Therefore, when resilient strips 31 are placed within the groves 32, the distance between the regulating surface 34 and the under surface of the resilient strips 31 varies along the length of the wiper blade especially adjacent the outer edge of the regulation surface. With the resilient strips 31 inserted in the grooves 32, the bottom surface 35' of the strips becomes the stop surface.

Figure 12:
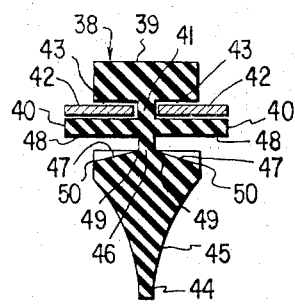

The blade 38 as shown in FIGURES 6 and 12 is comprised of a head portion 39, lateral extensions 40 and a neck portion 41 connecting therebetween. The blade 38 also includes a pair of grooves 43 between the head portion and the lateral projections which are adapted to receive the resilient strips 42. The wiping portion 45 of the blade 38 is of inverse trigonal shape provided with a wiping edge 44 and is secured to the upper portion of the blade by means of a flexible connecting portion or neck 46. The upper surface of the wiping portion 45 becomes a regulating surface 47 and the under surface of the lateral projections 40 becomes a stop surface 48 against which the regulating surface 47 is adapted to abut when the wiping portion 45 of the blade is disposed in angular wiping position. The regulating surface 47 is formed parallel to the stop surface 48 and spaced therefrom by relatively narrow distance C at the heavily loaded portions of the blade and is formed with a downward inclination from the inner edge 49 of the regulating surface to the outer edge 50 with a relatively wider distance between the stop surface 48 and the regulating surface 47 adjacent the outer edge 50. This embodiment is different from the preceding embodiment inasmuch as the flexible connecting portion 46 is provided separately from the grooves 43 which are adapted to receive the resilient strips 42. Therefore, the regulating surface 47 does not contact the under surface of the resilient strips 42 but the stop surface 48.

Figure 13:
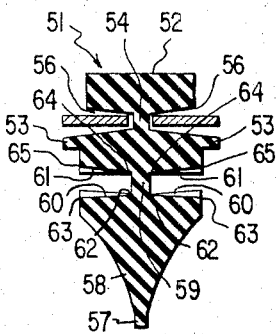

The blade 51 as shown in FIGURES 7 and 13 is the same as the blade 38 shown in the preceding embodiment and is comprised of a head 52 laterally extending projections 53 and a neck portion 54 extending therebetween. The blade 51 also includes grooves 56 which are adapted to receive the resilient strips 55. The wiping portion 58 is of a substantially inverse trigonal shape having a wiping edge 57 and is connected with the upper portion of the blade by a flexible connecting part 59. The upper surfaces of the wiping portion 58 comprise the regulation surfaces 60 and the under surface of the laterally extending portions 53 comprise the stop surfaces 61 with which the regulating surfaces 60 come in contact as the wiping portion flexes about the connection portion 59. The regulating surface 60 is inclined upwardly from the inner edge 62 of the regulating surface to the outer edge 63 at the heavily loaded portions of the wiper blade and is inclined downwardly from the inner edge 62 to the outer edge 63 at the lightly loaded portions of the wiper blade. The stop surface 61 is inclined downwardly from the inner edge 64 of the stop surface 61 to the outer edge 65 at the heavily loaded portions and is inclined upwardly from the inner edge 64 to the outer edge 65 at the lightly loaded portions of wiper blade. Thus, the distance between the outer edges 63 and 65 of the regulating surface 60 and the stop surface 61 is narrower at (e) than at (f).

In the three embodiments described above, the largest difference of distance occurs at the outer edges of the stop surface and the regulating surface.

Figure 14:
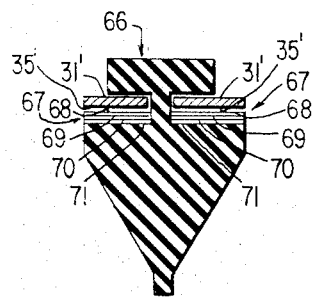

The blade 66 shown in FIGURES 8 and 14 is a modification of the blade 26 shown in FIGURES 5 and 11. The regulating surface 67 of the blade 66 which corresponds to the regulating surface 34 of the blade 26 is provided with step-down surfaces 68, 69, 70 and 71 from the heavily loaded portions to the lightly loaded portions. The distance between each surface of the regulating surface 67 and the stop surfaces 35', which is the under surface of the resilient strips 31', is narrow as indicated (g), the heavily loaded portion, and wider as indicated at (h) at the lightly loaded portions. In FIGURE 14, it is clearly understood that each of the surfaces 68, 69, 70 and 71 of the regulating surface 67 are parallel to the stop surface 35'. The difference of distance between stop surface 35' and the regulating surface 67 at the outer edges is the most important factor to determining the wiping angle of the blade with respect to the glass. Therefore, if the regulating surface 67 is formed parallel to the stop surface 35', then a predetermined effect can be obtained.

Figure 15:
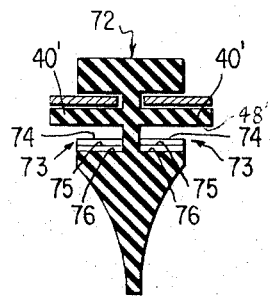

The blade 72 as shown in FIGURES 9 and 15 is a modification of the blade 38 shown in FIGURES 6 and 12. The regulating surface 73 of the blade 72 which corresponds to the regulating surface 47 of the blade 38 is provided with step-down surfaces 74, 75 and 76 from the heavily loaded portions to the lightly loaded portions. The distances between the stop surface 48' and the step-down surfaces 74, 75 and 76 are varied from a narrow distance (i) at the heavily loaded portion to a wider distance (j) at the lightly loaded portions of the blade. As seen in FIGURE 15, each of the surfaces 74, 75 and 76 of the regulating surface 73 are formed parallel to the stop surface 48' so that the same effect as described above with respect to the preceding embodiment can be obtained.

Figure 16:
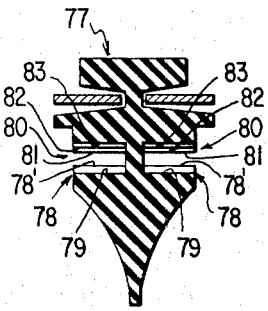

The blade 77 as shown in FIGURES 10 and 16 is a modification of the blade 51 as shown in FIGURES 7 and 13. The regulating surface 78 of the blade 77 which corresponds to the regulation surface 60 of the blade 51 is provided with step-down surfaces 78' and 79 from the heavily loaded portions to the lightly loaded portions of the blade. The stop surface 80 of the blade 77 which corresponds to the stop surface 61 of the blade 51 is provided with step-up surfaces 81, 82 and 83 from the heavily loaded portions to the lightly loaded portions of the blade. The distances between the stop surface 80 and each of the positions of the regulating surface 78 are varied from a narrow distance (k) at the heavily loaded portions to the wider distance (l) at the lightly loaded portions of the blade. In other words, the distance between the stop surface 80 and the regulating surface 78 is determined according to the magnitude of the load at that portion of the blade. In this embodiment, it is clearly seen in FIGURE 16, the regulating surface 78 is formed parallel to the stop surface 80.

As stated above, the present invention resides in the fact that the distance between a regulating surface, which is the upper surface of the wiping portion of the blade and a stop surface with which the regulating surface collides is varied according to the magnitude of the load imposed in order to correct irregular wiping angles along the length of the wiper blade. The blade according to the present invention is elastically deformed as shown in FIGURE 18 to make the desired wiping angle.

When load G is given to the window glass surface $x$ from the direction denoted with an arrow $y$, then the load G is imposed at the same height from the glass surface $x$ at the heavily loaded portion as well as at the lightly loaded portion because of correction by means of varying the distance between the regulating surface and the stop surface according to the magnitude of load without changing the rigidity of the blade against elastic deformation. Furthermore, the elastic deformation at the lightly loaded portion is small and, on the other hand, the elastic deformation at the heavily loaded portions is large. Therefore, the wiping angle which is constituted of modified fundamental line A' of the lightly loaded portion and the window glass surface $x$ coincides with the wiping angle which is constituted by modified fundamental line B' of the heavily loaded part and the window glass surface $x$. Accordingly, a uniformly wiped surface can be obtained.

This invention is not to be confined to any strict conformity with the showings in the drawings but may be changed or modified so long as such changes or modifications mark no material departure from the salient features of the invention as set forth in the appended claims.

What is claimed is:

1. A wiper blade construction comprising an elongated, flexible blade member having a wiping portion and an attachment portion, groove means formed in said attachment portion in opposite sides thereof and extending the length of said blade, said groove means having an upper stop surface and a lower regulating surface spaced from said upper stop surface at varying distances along the length thereof wherein the spacing between said stop surfaces and said regulating surface varies inversely with the load applied to said blade along the length thereof.

2. A wiper blade construction as set forth in claim 1 wherein said groove means is comprised of a groove in each side of said attachment portion in opposed relation to each other.

3. A wiper blade construction as set forth in claim 2 wherein said opposed grooves are separated by relatively narrow flexible neck means allowing said wiping portion to be flexed with respect to said attachment portion.

4. A wiper blade construction according to claim 1 wherein portions of said surfaces subject to relatively heavy loading are parallel to each other and portions of said surfaces subject to relatively light loading diverge outwardly from the bottom of said groove means.

5. A wiper blade construction according to claim 1 wherein said surfaces are parallel throughout the length of said groove means with the portions of said surfaces subject to heavy loading being spaced closer than the remaining portions of said surfaces.

6. A wiper blade construction as set forth in claim 1 further comprising additional groove means in said attachment portion parallel to and above said first mentioned groove means for receiving means for attaching said blade to a drive means.

References Cited

UNITED STATES PATENTS

| 2,925,615 | 2/1960 | Krohm | 15—250.42 |
| 3,082,464 | 3/1963 | Smithers | 15—250.42 |
| 3,108,308 | 10/1963 | Oishei | 15—250.42 |
| 3,140,501 | 7/1964 | MacPherson | 15—250.36 |

PETER FELDMAN, *Primary Examiner.*

U.S. Cl. X.R.

15—250.42